(12) United States Patent
Sloan et al.

(10) Patent No.: US 7,762,057 B2
(45) Date of Patent: Jul. 27, 2010

(54) INTERNAL MIXING OF A PORTION OF FAN EXHAUST FLOW AND FULL CORE EXHAUST FLOW IN AIRCRAFT TURBOFAN ENGINES

(75) Inventors: Mark L. Sloan, Newcastle, WA (US); Edward C. Marques, Issaquah, WA (US); Matthew D. Moore, Everett, WA (US); William J. Bigbee-Hansen, Renton, WA (US)

(73) Assignee: The Boeing Company, Chicago, IL (US)

( * ) Notice: Subject to any disclaimer, the term of this patent is extended or adjusted under 35 U.S.C. 154(b) by 333 days.

(21) Appl. No.: 11/758,406

(22) Filed: Jun. 5, 2007

(65) Prior Publication Data

US 2008/0302083 A1 Dec. 11, 2008

(51) Int. Cl.
*F02K 3/02* (2006.01)
(52) U.S. Cl. .................. 60/226.1; 60/226.3; 60/262
(58) Field of Classification Search ............. 60/262, 60/226.1–226.3
See application file for complete search history.

(56) References Cited

U.S. PATENT DOCUMENTS

| | | | |
|---|---|---|---|
| 3,579,993 A | 5/1971 | Tanner | |
| 3,601,340 A | 8/1971 | Hilbig | |
| 3,721,389 A * | 3/1973 | MacKinnon et al. | ... 239/265.19 |
| 3,726,091 A | 4/1973 | Tontini | |
| 3,814,323 A | 6/1974 | Leynaert et al. | |
| 4,142,365 A * | 3/1979 | Sargisson et al. | ............. 60/204 |
| 4,372,110 A | 2/1983 | Cheng | |
| 4,501,393 A * | 2/1985 | Klees et al. | ............ 239/265.13 |
| 5,216,879 A * | 6/1993 | Zysmaan | ..................... 60/262 |
| 5,261,227 A * | 11/1993 | Giffin, III | .................. 60/226.1 |
| 5,440,875 A | 8/1995 | Torkelson et al. | |
| 5,603,471 A * | 2/1997 | Armstrong | ............... 244/53 R |
| 5,758,488 A | 6/1998 | Batey | |
| 5,761,900 A | 6/1998 | Presz, Jr. | |
| 5,775,095 A | 7/1998 | Zysman et al. | |
| 5,884,843 A | 3/1999 | Lidstone et al. | |

(Continued)

OTHER PUBLICATIONS

Yoshiya Nakamura, UK-Japan Bilateral Workshop on The Environmental Impact of Aircraft Emissions & Noise and Impact Reduction Technologies—"Japanese Activities on Engine Noise Technology—Focusing on SST and Small Subsonic Aircraft", Jan. 17-19, 2006.

(Continued)

*Primary Examiner*—Michael Cuff
*Assistant Examiner*—Phutthiwat Wongwian
(74) *Attorney, Agent, or Firm*—Harness, Dickey & Pierce, P.L.C.

(57) ABSTRACT

An aircraft includes at least one turbofan engine assembly having a shrouded core engine, a short nacelle surrounding a fan and a forward portion of the core engine, and a fan exhaust duct through the nacelle. A mixer duct shell is positioned substantially coaxial with the engine shroud and extends forwardly into the fan duct to provide an interstitial mixer duct between the mixer duct shell and the core engine shroud. The aft portion of the mixer duct shell extends over a turbine exhaust frame, an attached mixer (if included), and a tail cone exhaust plug. The mixer duct shell can reduce noise and plume exhaust heat radiated from aircraft turbofan engines.

25 Claims, 10 Drawing Sheets

U.S. PATENT DOCUMENTS

| | | | |
|---|---|---|---|
| 6,070,407 A * | 6/2000 | Newton | 60/226.1 |
| 6,311,928 B1 | 11/2001 | Presz, Jr. et al. | |
| 6,786,038 B2 | 9/2004 | Lair | |
| 6,854,260 B2 * | 2/2005 | Anderson | 60/204 |
| 6,935,098 B2 | 8/2005 | Bardagi et al. | |
| 2004/0244357 A1 * | 12/2004 | Sloan | 60/204 |
| 2005/0082112 A1 * | 4/2005 | Harrison | 181/214 |
| 2008/0271431 A1 * | 11/2008 | Porte | 60/226.1 |

OTHER PUBLICATIONS

Stage III Technologies; www.stageiii.com/hushkit_ejector.asp; "Ejector", Jan. 2007.

* cited by examiner

INTERNAL MIXING OF A PORTION OF FAN EXHAUST FLOW AND FULL CORE EXHAUST FLOW IN AIRCRAFT TURBOFAN ENGINES

FIELD

The present disclosure relates generally to aircraft and, more particularly, to controlling noise and exhaust plume heat radiated from aircraft turbofan engines.

BACKGROUND

The statements in this section merely provide background information related to the present disclosure and may not constitute prior art.

In conventional aircraft, engines commonly are installed beneath the aircraft wings. Jet noise produced by the engines (most commonly, the "roar" heard at takeoff,) can radiate largely unabated to nearby communities. Engine exhaust noise can be amplified when the sound is reflected off undersurfaces of the wing. Heat emitted from the engine exhaust plume also tends to be reflected off of wings and pylons. In the case of military or derivative aircraft, this reflected heat can tend to increase susceptibility of turbofan-powered aircraft to heat-seeking missiles, when operated in threat environments.

SUMMARY

In one implementation, the disclosure is directed to an aircraft including at least one turbofan engine assembly having a fan driven by a core engine, a short nacelle around the fan and a forward portion of the core engine, and a fan exhaust duct through the nacelle. A mixer duct shell is substantially coaxial with and extends forwardly into the fan exhaust duct to provide a mixer duct between the mixer duct shell and the core engine.

In another implementation, the disclosure is directed to a method of controlling plume exhaust heat and/or noise radiation from an aircraft turbofan engine assembly having a short nacelle. The method includes routing a first portion of fan exhaust through a mixer duct between an inner surface of a mixer duct shell and a core engine of the assembly toward a nozzle through which engine exhaust passes, and routing a second portion of fan exhaust over an outer surface of the mixer duct shell.

In yet another implementation, the disclosure is directed to an aircraft including at least one turbofan engine assembly having a core engine, a short nacelle around a forward portion of the core engine, and a fan duct through the nacelle. A mixer duct shell is mounted around an aft portion of the core engine and has a forward portion extending forwardly into an exit nozzle of the nacelle to provide a mixer duct between the mixer duct shell and the core engine aft portion.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
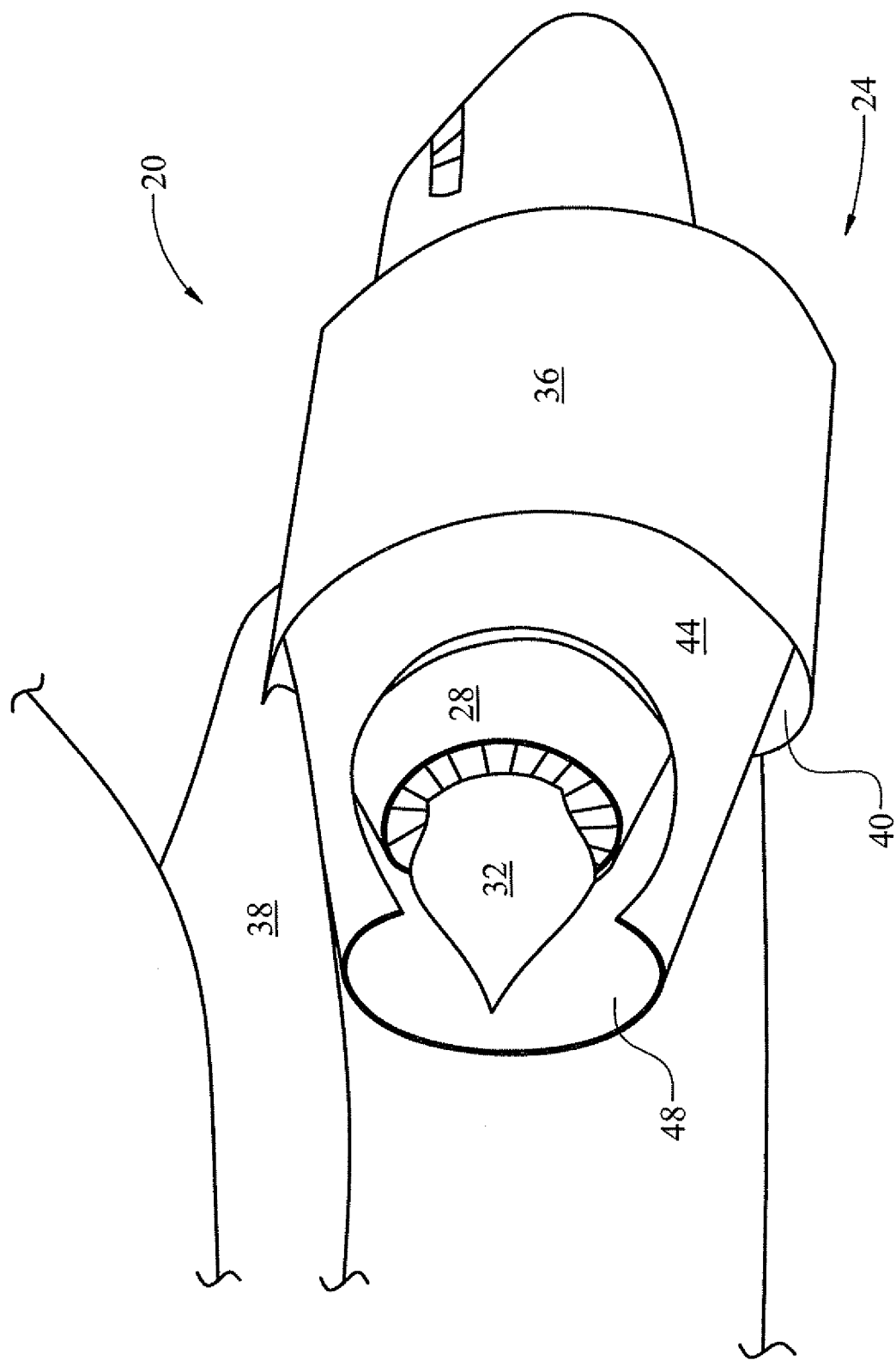
FIG. 1 is a partial right rear perspective view of an aircraft and engine assembly in accordance with one implementation of the disclosure, with a portion of a mixer duct shell cut away.

An aircraft adapted in accordance with one implementation of the disclosure is partially shown and indicated generally in FIG. 1 by reference number 20. The aircraft 20 has preferably one or more turbofan engine assemblies, one of which is shown in FIG. 1 and indicated generally by reference number 24. The engine assembly 24 includes a core engine 28 having an attached tail cone exhaust plug 32. The engine assembly 24 includes a short nacelle 36 mounted to a wing pylon 38. A "short" nacelle is one that is shorter than its associated core engine. Thus the short nacelle 36 provides a short fan duct 40 through which exhaust from a fan forward of the core engine 28 may exit the nacelle 36 alongside the shroud cover over the core engine 28.

One configuration of a mixer duct shell is indicated by reference number 44. A portion of the shell 44 is shown as having been cut away to partially expose the core engine 28.

The shell 44 is substantially coaxial with both the fan duct 40 and shroud cover of the core engine 28. The shell 44 extends forwardly into the fan duct 40 to provide an interstitial mixer duct 48 between the shell 44 and both the shroud cover of the core engine 28 and the tail cone exhaust plug 32. As further described below, the fan duct 40 and interstitial mixer duct 48 are configured to provide a means of mixing a partial (e.g., a minority) amount of fan exhaust with the core engine exhaust and to bypass the other (e.g., majority) amount of fan exhaust out the exit of nacelle 36 alongside the outer surface of the mixer duct shell 44.

Figure 2A:
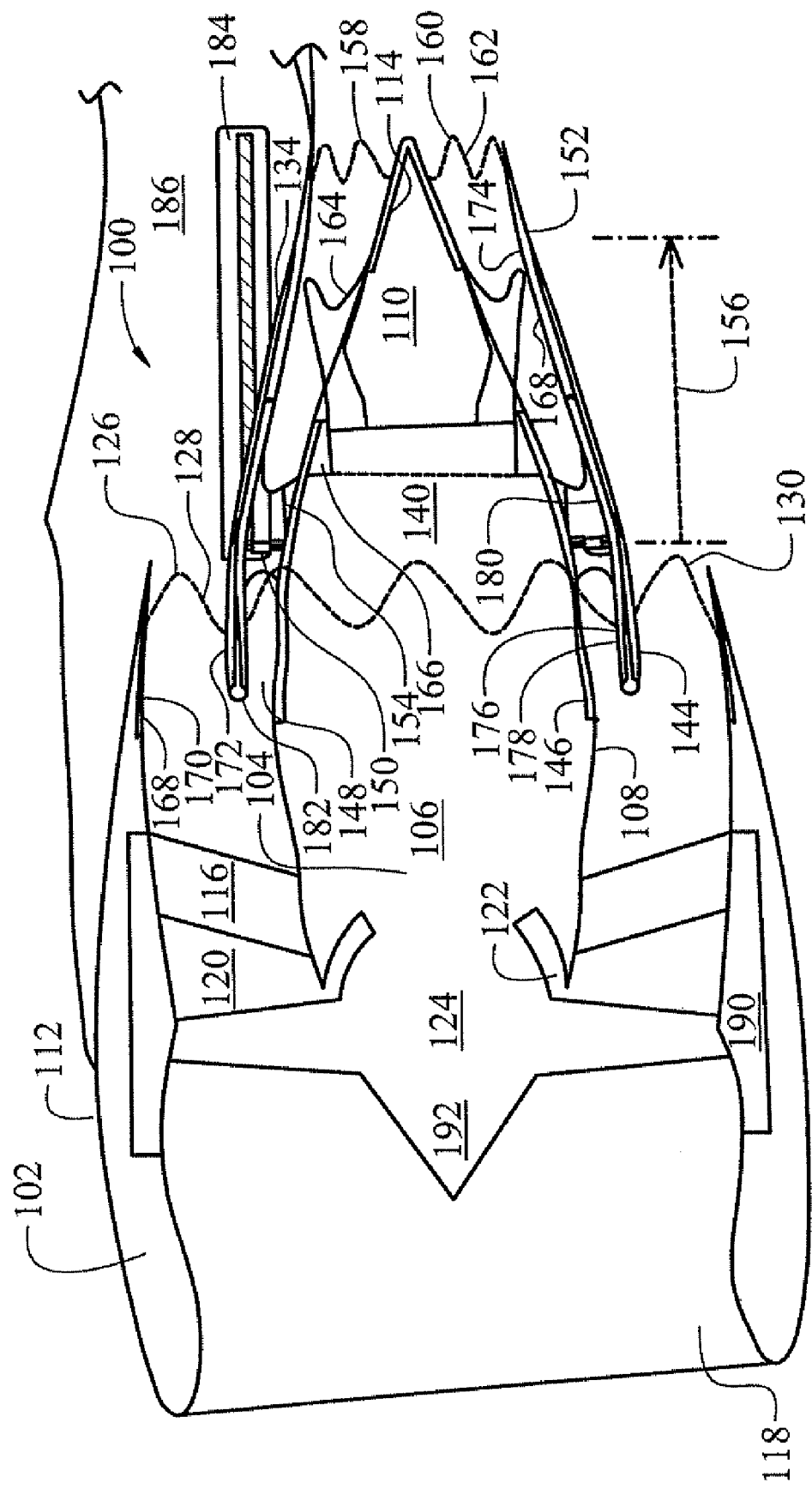
FIG. 2A is a longitudinal sectional diagrammatic view of an engine assembly in accordance with one implementation of the disclosure.

One configuration of an engine assembly is indicated generally in FIG. 2A by reference number 100. A short nacelle 102 is mounted around a forward portion 104 of a core engine 106. The core engine 106 is covered by a core engine shroud 108. The core engine 106 extends through and aft of the nacelle 102 and ends with a tail cone exhaust plug 110. The nacelle 102 includes a fan case frame 190 and nacelle shroud 112 mounted on the core engine 106 by struts 116. Air enters the nacelle 102 through a turbofan inlet 118 and travels through a fan pressurized duct 120. Air also enters core inlets 122 aft of a nose cone 192 and fan portion 124 of the core engine 106. The nacelle 102 has an exit nozzle 126. In the present exemplary embodiment, an edge 128 of the nozzle 126 includes a plurality of chevrons 130. It should be noted generally that engine assemblies having other short nacelle configurations could be adapted in accordance with principles of the disclosure. For example, in some implementations, a nacelle exit nozzle may include a variable area nozzle and not include chevrons.

Figure 2B:
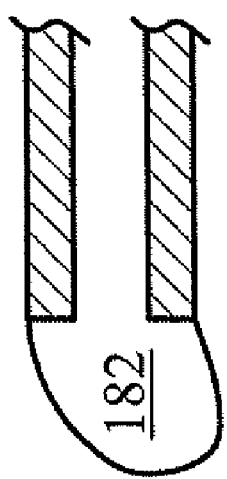
FIG. 2B is a view of a leading edge of a mixer duct shell of the engine assembly shown in FIG. 2A.

One configuration of a mixer duct shell 134 is mounted on an aft portion 140 of the core engine 106. A forward portion 144 of the shell 134 extends forwardly into the nacelle exit nozzle 126 to provide an interstitial mixer duct 148 between the shell 134 and the shroud 108 extending over the core engine aft portion 140. A leading edge 182 of the shell 134 is shown in greater detail in FIG. 2B. The leading edge 182 is thickened and aerodynamically contoured to prevent flow separation. The shell forward portion 144 is affixed to the core engine shroud 108 by a plurality of circumferentially spaced and aerodynamically tailored radial pillars 150. The pillars are preferably oriented in line with the crowns of the lobed mixer 164 to minimize noise. An aft portion 152 of the shell 134 may be moved in an aft-ward direction along a pillar slide 154 with weight supported on a sliding track 184 attached to the engine pylon sidewall 186. Moving the aft portion 152 provides access to underlying structure, e.g., access to portals for turbine inspections and access to sections of the shell 134 and aft core engine 140. An exemplary range of possible translation of the aft portion 152 is indicated by an arrow 156. The movable shell portion 134 has a convergent exit nozzle 158. In the present exemplary configuration, the nozzle 158 includes a plurality of chevrons 160 along a nozzle edge 162. Other or additional fixed or variable area nozzle configurations are contemplated, however, that do not include chevrons.

A lobed mixer 164 is positioned aft of a turbine frame section 166 of the core engine 106 and may be integrated with the tail cone exhaust plug 110. The lobed mixer may be scalloped as dictated by an optimum contour for the engine. The mixer 164 is positioned inside the shell 134 and upstream of the shell exit nozzle 158. It should be noted that configurations are contemplated in which other or additional means of mixing may be provided upstream of the mixer duct shell nozzle exit 158. Configurations also are contemplated in which no lobe mixer is provided.

In various configurations, the shell 134 is sufficiently cooled by the fan airflow during engine operation such that lower cost liners for acoustic absorption and/or debris containment may be structurally integrated into the engine assembly at minimal weight. Debris containment liners may be made, e.g., of woven composite. In various engine assembly configurations, various liners may be provided for reducing noise and/or for containing turbine fragments. For example, the engine assembly 100 includes an acoustic lining 168 covering as much of an inner surface wetted area 170 as practical. Acoustic lining 168 also may be provided, e.g., along part of an outer surface 172 of the shell fixed forward portion 144 opposite the nacelle inner surface 170, and on portions of a surface 146 of the core engine shroud 108. Acoustic lining 168 also may be provided, e.g., along part of an aft inner surface 174 of the shell movable aft portion 152 and on a conical trailing surface 114 of the exhaust plug 110. In some applications, the acoustic liners on the aft inner surface 174 and conical exhaust plug surface 114 are tuned for control of jet mixing noise. Containment liners 176 may be provided in the vicinity of the turbine frame section 166, e.g., along an inner surface 178 of the shell fixed forward portion 144 and along a forward inner surface 180 of the shell movable aft portion 152. It should be noted that acoustic and/or containment liners may be provided in various ways and locations, or not provided at all, dependent, e.g., on engine assembly structure and performance.

In some embodiments, the leading edge 182 of the shell 134 penetrates into the nacelle exit nozzle 126 sufficiently far to act as an aerodynamic inlet to the mixing duct 148 at fan stage pressure. The core barrel shroud 108 may be re-contoured so as to allow penetration of the leading edge 182 to be for a minimal longitudinal length forward from the fan nozzle exit edge 128. For retrofit applications the core engine shroud surface 108 may be re-contoured inward opposing the thickened leading edge 182 to accommodate increased leading edge thickness without reducing cross sectional area for the portion of fan flow entering the interstitial mixing duct 148. Keeping a constant inlet cross-sectional area ensures that the entrance velocity is minimized and velocity dependent pressure losses are lowered as the fan air moves down the interstitial duct toward the mixer. In new engine applications, normal design methods will ensure that the duct work accommodates the correct flow path areas, at entrance, along the paths and at exit to optimize performance over the range of powered conditions. In generally all applications the mixer duct leading edge 182 is also positioned aft of a mechanism for thrust reversal and does not affect or inhibit thrust reverser function, reliability or reverse thrust generation. In some applications the core barrel shroud 108 has acoustic lining covering as much of the flow-wetted area as practical.

Figure 3A:
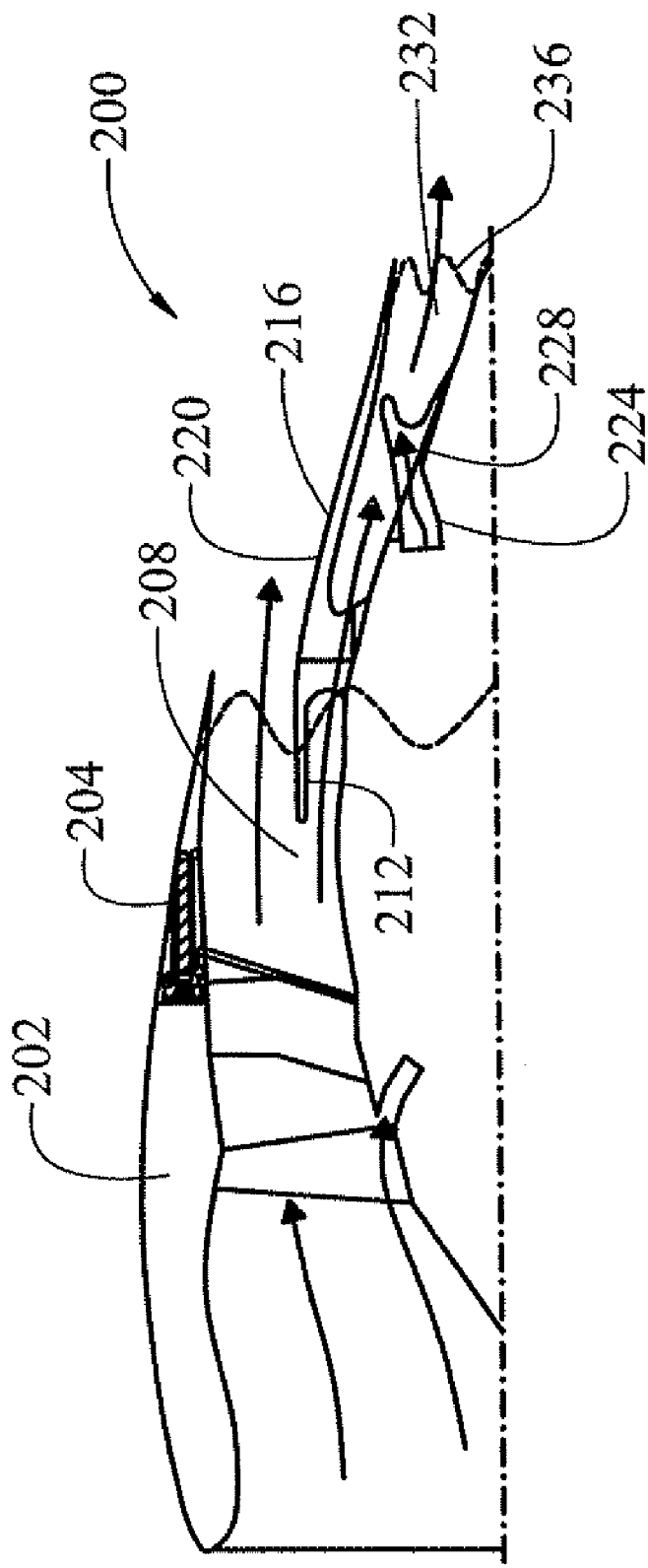
FIG. 3A is a partial longitudinal sectional diagrammatic view of an engine assembly in accordance with one implementation of the disclosure, in which a thrust reverser is in a retracted position.
Figure 3B:
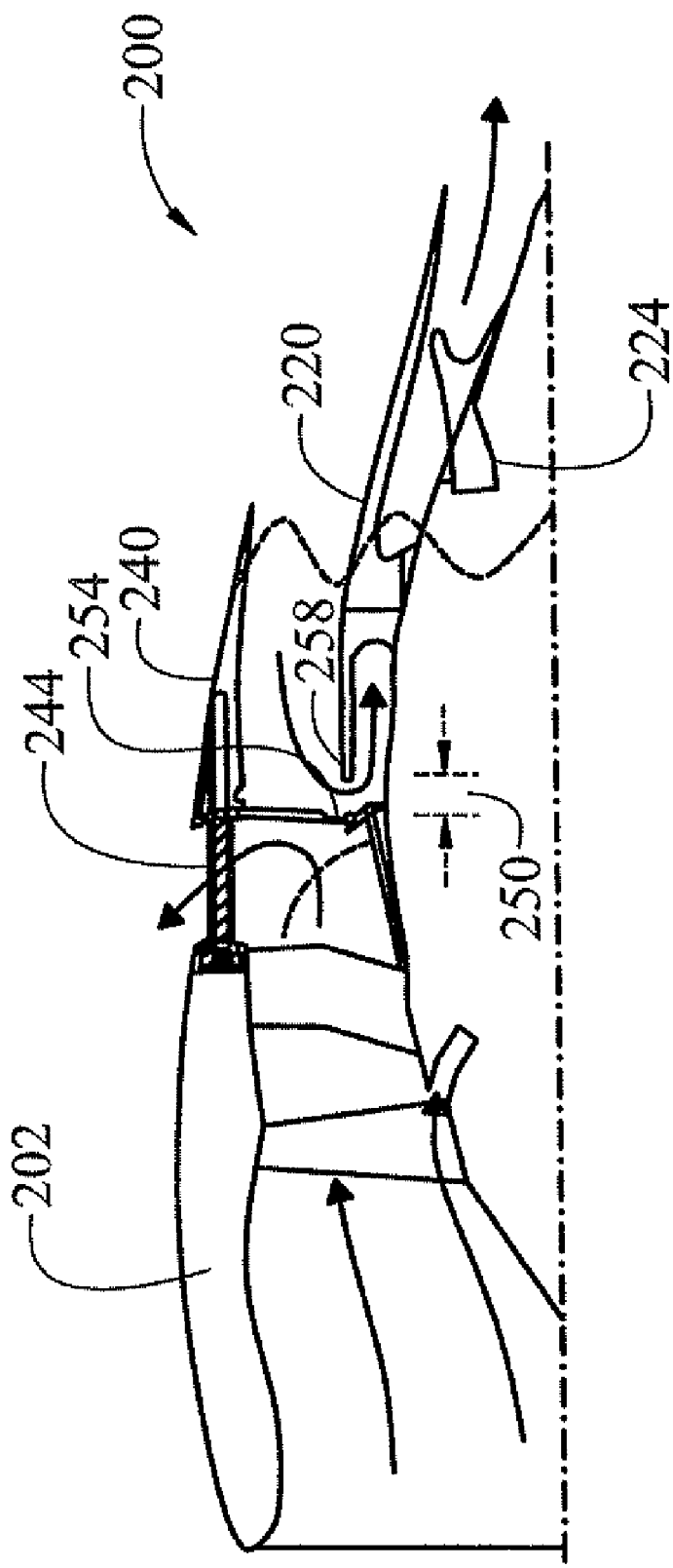
FIG. 3B is a partial longitudinal sectional diagrammatic view of an engine assembly in accordance with one implementation of the disclosure, in which a thrust reverser is in a deployed position.

An exemplary engine assembly is partially shown and indicated generally in FIGS. 3A and 3B by reference number 200. The assembly 200 includes a short nacelle 202. Referring to FIG. 3A, a thrust reverser 204 is in a retracted position. Fan exhaust 208 flows along both sides 212 and 216 of a mixer duct shell 220. Engine core exhaust 224 flows from a mixer 228 and is mixed internally with fan exhaust 208. Mixed exhaust 232 exits the engine assembly through a nozzle 236 of the shell 220. Referring to FIG. 3B, as a rear portion 240 of the nacelle 202 slides aft and, e.g., exposes "C shaped" cascade type reverser vanes 244, there are no interferences with the shell 220. During normal reverser operation, core flow 224 exits the mixer 228, but without interleaved fan flow, and thus tends to slow down (diffuse) through the nozzle exit 236—at a lower velocity than typically would be the case in the absence of the shell 220. A gap 250 between a deployed diverter gate 254 of the thrust reverser 204 and leading edge 258 of the mixer duct shell 220 determines a residual amount of cool air flow entrained backwards from the fan exhaust nozzle exit into the interstitial mixer duct by ejection effect of the diffused core exhaust flowing through the lobed mixer. This gap can be optimized, for a given implementation, to create adequate diffusion of core exhaust and sufficient backflow entertainment from the fan exit to keep mixer surfaces cooled and to lessen the residual forward thrust component. Thus, advantageously, net magnitude of reverse thrust (thrust reverser effectiveness) can be increased, for implementations with at least some types of thrust reversers.

In various implementations of the disclosure, an apportioned amount of pressurized fan air combined with core exhaust flow, e.g., a 2:1 mass flow ratio, can be captured and ducted. In typical high-bypass engines where the total fan air mass flow to turbine core flow ratio ranges from about 4.5:1 to greater than about 10:1, the apportioned mass flow ratio of 2:1 represents a minority portion of the fan duct mass flow. At about a 2:1 mass flow mixing ratio, a prior art scalloped lobe mixer can be used, e.g., to internally mix core exhaust to a core static temperature at least 200 degrees K less than the temperature in an engine assembly in which such mixing is not performed and when the engine is at nearly full take-off thrust or climb thrust settings. Additionally in high thrust conditions, the 2:1 mixed core exhaust may exhibit a core velocity at least 250 feet per second less than the core velocity of an engine assembly in which mixing is not performed.

Figure 4A:
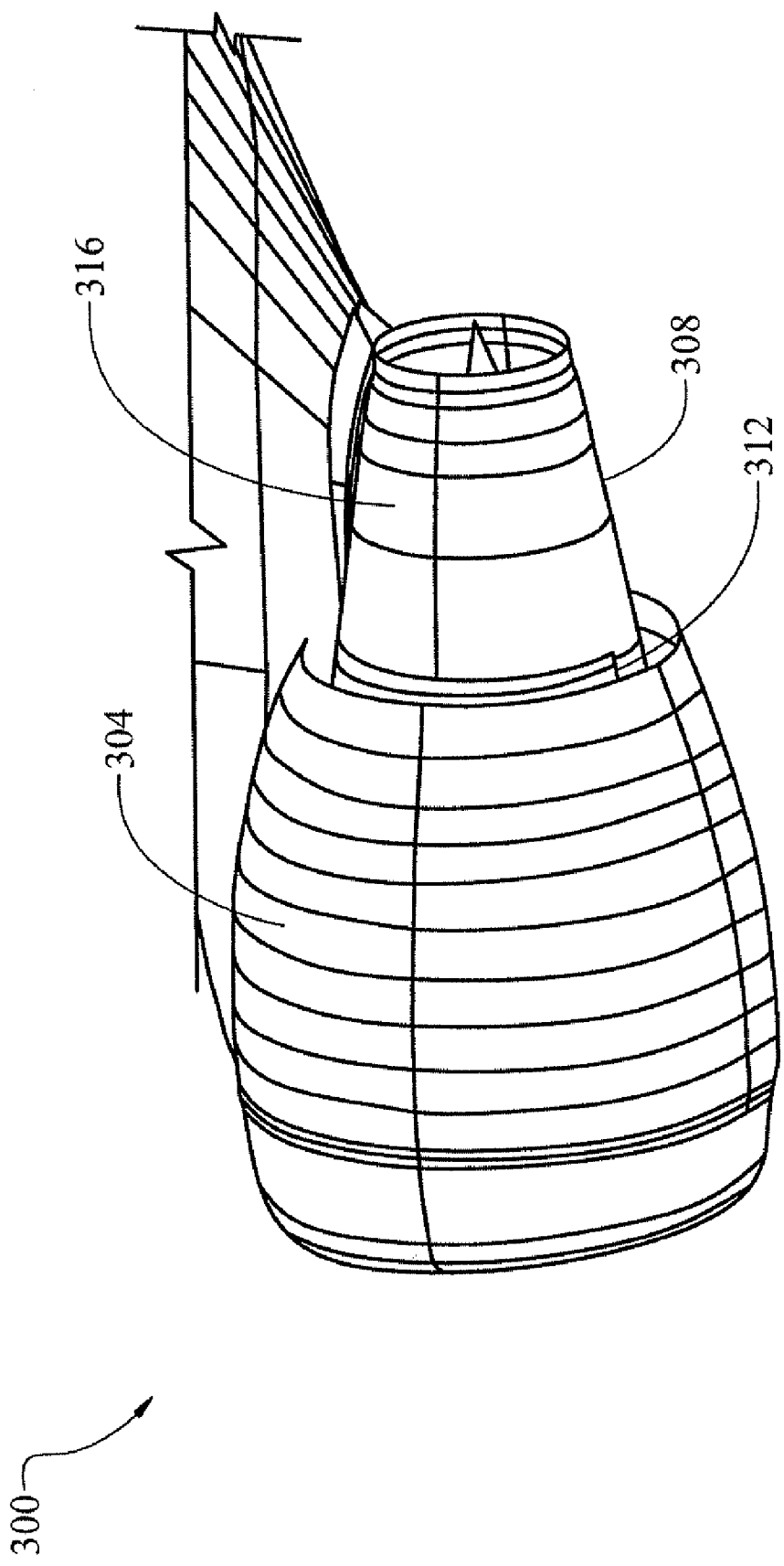
FIG. 4A is a perspective view of an engine assembly in accordance with one implementation of the disclosure, in which forward and aft portions of a mixer duct shell are contiguously positioned.
Figure 4B:
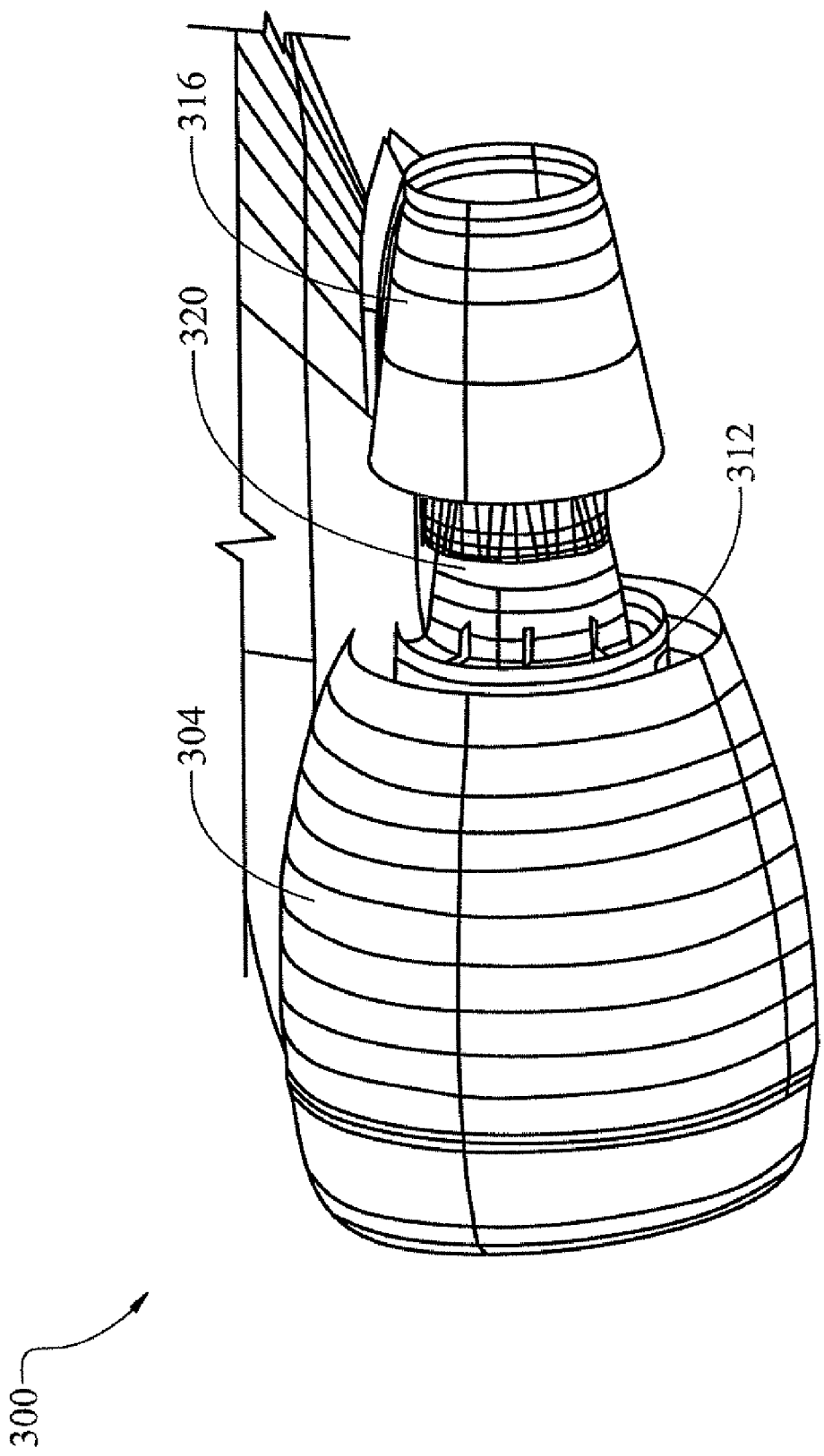
FIG. 4B is a perspective view of an engine assembly in accordance with one implementation of the disclosure, in which a movable aft portion of a mixer duct shell is positioned apart from a fixed forward portion of the shell to provide maintenance access to underlying aft engine hardware while the engine is not in operation.
Figure 4C:
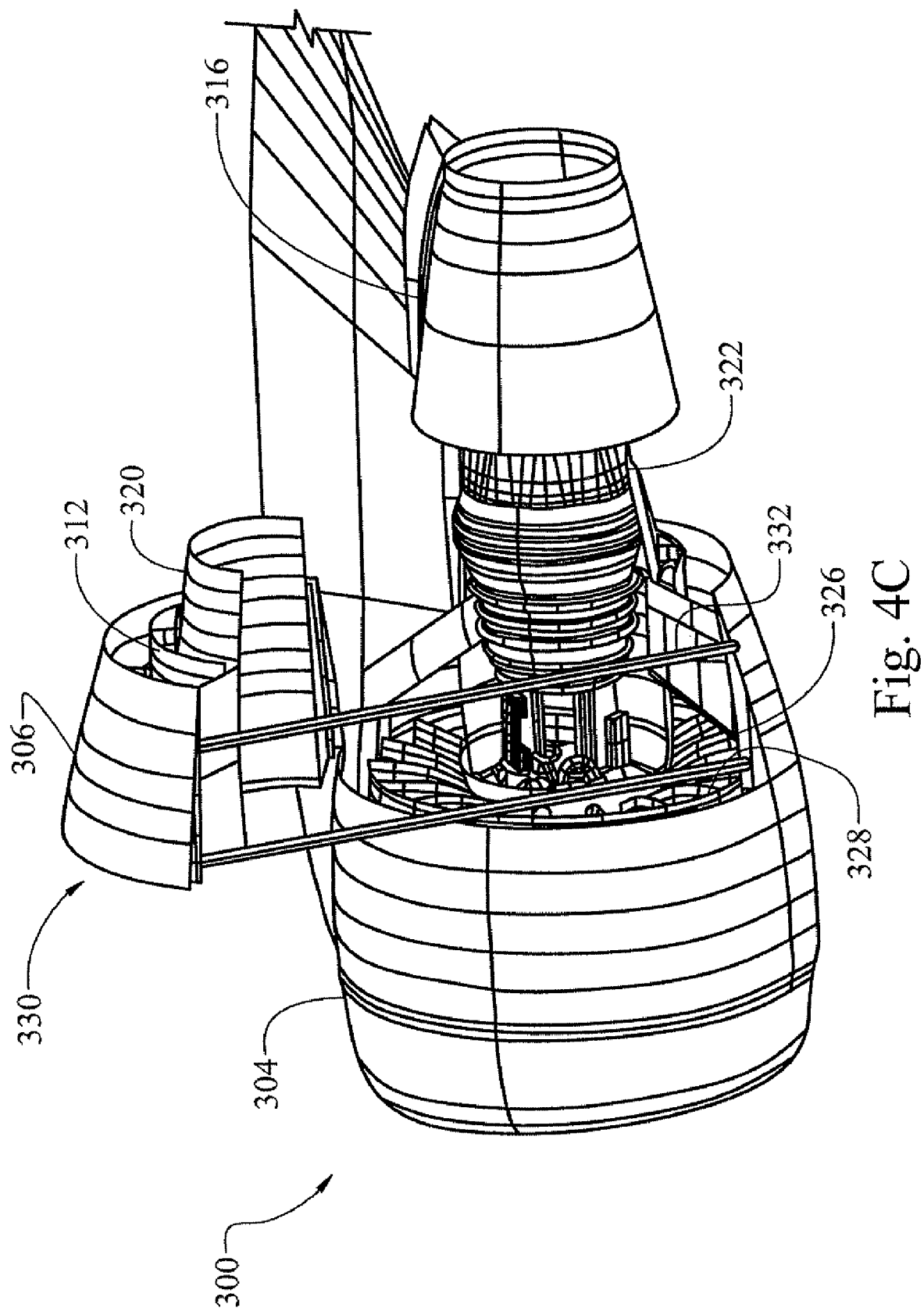
FIG. 4C is a perspective view of an engine assembly in accordance with one implementation of the disclosure, in which a movable aft portion of a mixer duct shell is positioned apart from a fixed forward portion of the shell, and an assembly of one side of an aft part of a short nacelle, core engine shroud and fixed portion of the mixer duct shell are raised together on a pylon mounted hinge and supported by attached rods.

As previously mentioned, for maintenance access, a mixer duct shell movable portion can be detached from an affixed portion of the shell and slid aft. One configuration of an engine assembly is indicated generally in FIGS. 4A, 4B, and 4C by reference number 300. The assembly 300 includes a short nacelle 304 and a mixer duct shell 308 having a fixed forward portion 312 and a movable aft portion 316. As shown in FIG. 4A, the forward and aft portions 312 and 316 are contiguous. As shown in FIG. 4B, the aft portion 316 is extended away from the forward portion 312 to expose part of an engine core shroud 320. As shown in FIG. 4C, for some turbofan engines, access can be gained to the engine core casing and components underneath an aft section 306 of the nacelle 304 and underneath the engine core shroud 320, forward of the lobed mixer 322. For such types of engines, the engine core shroud 320, the fixed portion of the mixer duct shell 312, and the aft section 306 of the fan nacelle 304 are joined as one duct assembly 330 on each side of the engine, forming two halves each hinged at the upper pylon seam and split at the lower centerline. The halves are detachable along a lower seam supported by structural frame member and lower bifurcation 326 extending aft from the forward fan case cowl and fan case frame 328. The duct assembly 330 can be raised and supported by rods 332 employing standard procedures to gain full access to the core engine, after the movable portion of the mixer duct 316 has been suitably detached and translated back, out of the way.

Figure 5A:
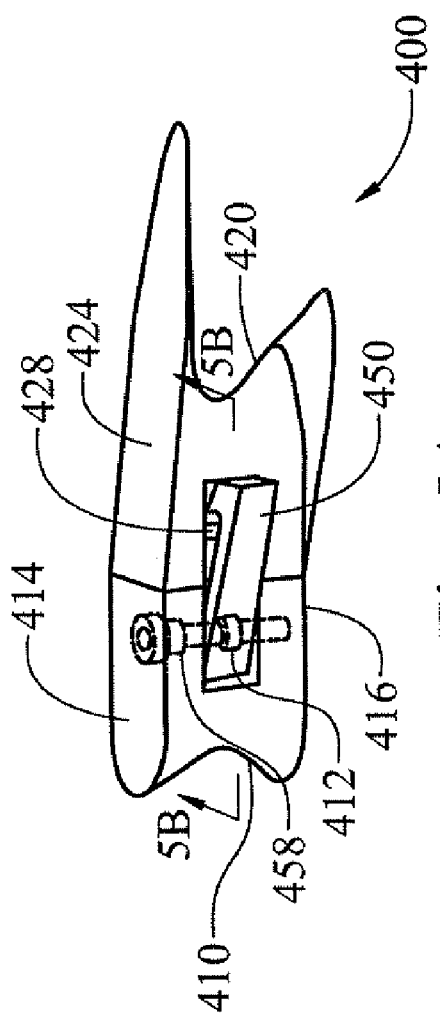
FIG. 5A is a partial side perspective view of an attachment device in engaged position in accordance with one implementation of the disclosure.
Figure 5B:
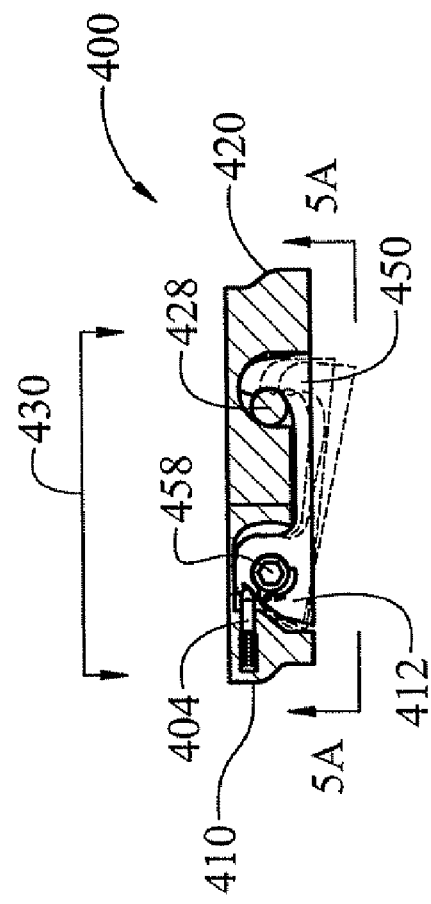
FIG. 5B is a top view of the attachment device shown in FIG. 5A, the view taken along lines 5B-5B of FIG. 5A.
Figure 5C:
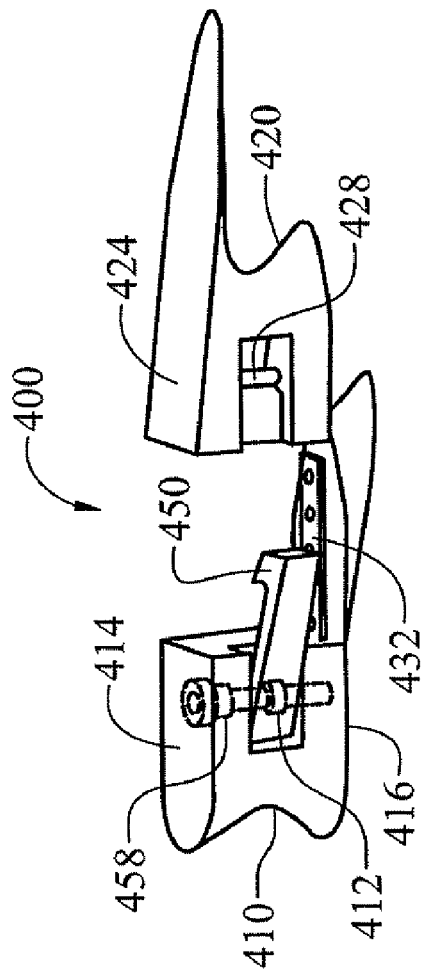
FIG. 5C is a partial side perspective view of an attachment device in disengaged position in accordance with one implementation of the disclosure.

A forward portion of a mixer duct shell is fixedly supported from the forward parts of circumferentially spaced radial pillars that extend from the core engine shroud outward to an interior concentric surface of the mixer duct shell. One such pillar attachment device is indicated generally in FIGS. 5A-5D by reference number 400. A base surface 416 of a forward radial pillar part 410 is fixedly attached to the core engine shroud and the forward mixer duct shell is fixedly attached to an outward surface 414 of the forward radial pillar part 410. A movable mixer duct shell aft portion is fixedly attached to an outward surface 424 of an aft movable pillar part 420 of the attachment device 400. A plurality of circumferentially-spaced forward pillar parts 410 are attached to the mixer duct shell's forward portion to provide for its radial standoff from the engine core shroud, forming an interstitial mixer duct 148, shown in FIG. 2A. An equal plurality of aft pillar parts 420 are attached in clocked alignment with forward pillar parts 410. The aft pillar parts 420 slide longitudinally along dovetail keyed surfaces 432 built into the forward pillar parts 410. The keyed surfaces act as longitudinal guides and serve to further constrain azimuth clocking motions that could otherwise compromise the integrity of the shell part latch-up. The weight of the aft mixer shell and attached pillar aft parts 420 are supported by a rail slide 184 built into the sidewall of the engine pylon 186, as previously referenced in FIG. 2A. As shown in FIG. 5C, the pillar parts 420 separate completely from their dovetail keyed sliding surfaces 432 as the movable portion of the mixer duct shell is slid aft ward. When slid forward back together as shown in FIG. 5A, the keyed sliding surfaces re-engage, thereby holding the sliding parts into alignment. Thus the attachment devices 400 permit the mixer duct shell aft portion to be released and slid longitudinally aft-ward quickly with full weight supported by the sliding track on the pylon and then slid back together quickly and re-engaged securely with a latch mechanism 430 built into pillar forward part 410.

Figure 5D:
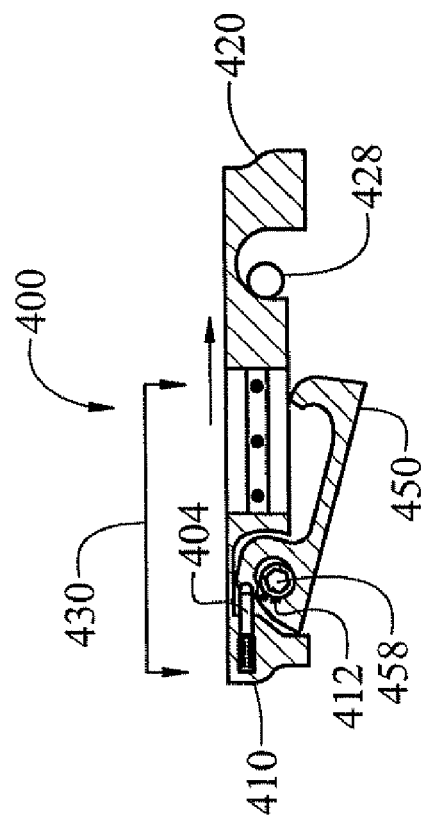
FIG. 5D is a top view of the attachment device shown in FIG. 5C.

When the movable portion of the mixer duct shell is slid into engagement, that is, when the pillar portions 420 and 410 are positioned into engagement, a rotating lock rod 458 with a hex head may be turned ninety degrees with a hex socket tool to securely lock each movable radial pillar part 420 to its adjacent fixed portion 410. FIG. 5B indicates the motion of a hooked latch 450, doweled catch 428, cam 412 on a lock rod 458 and a spring loaded pin 404 that adds resistance to the latch 450 while it is in the locked position so as to keep it held in tension on the catch 428. When the lock rod is rotated back for release as shown in FIG. 5D, the spring loaded pin 404 and new position of the cam 412 cause the latch to spring open and remain open, freeing the movable portion 420 to slide aft. Thus the movable portion 420 may be secured or released by means of a plurality of (for example, eight) ninety-degree twists of the rotating lock rods 458. Supporting radial pillar portions 410 and 420 may be circumferentially spaced in coincidence with crowns of the lobes of a flow mixer, for example, the mixer 164 shown in FIG. 2A. Alignment of pillars 400 with mixer lobes reduces surface Mach numbers on the downstream lobes and reduces overall viscous losses.

Various implementations make it possible to incorporate additional acoustic absorbing liners and/or chevron nozzle treatments if desired. Acoustic liners may be, for example, porous honeycomb sandwich-style acoustic absorbers. Such absorbers may be used, for example, to line at least a portion of a forward fan cowl and aft fan nozzle. Some implementations may include opposing acoustic liners and a liner structurally disposed on an outer surface of an affixed portion of the core engine shroud, mixer duct shell, inner surface of the mixer duct, and tail cone exhaust plug such as previously described with reference to FIG. 2A. Such linings may cooperate with a fan exit nozzle liner to absorb modal and broadband noise propagating aft-ward through engine bypass ductwork.

Referring again to FIG. 2A, the inner surface of the shell movable portion 152 near the aft mixed-jet nozzle 158 may also be structurally disposed with additional acoustic absorber lining. Such lining can diminish sound intensity of modal and/or broadband noise generated by the fuel combustor, rotating turbo-machinery, stator vanes, turbulent flow mixing and mixer trailing edges. In some configurations, application-specific, supplemental low-to-medium temperature-tolerant woven polymeric liners may be attached to inward facing surfaces of the mixer duct shell affixed portion 144 and forward segment of the inner surface of the movable portion 152, upstream of the lobed mixer 164. In such manner, containment may be enhanced, in an azimuthally directional fashion, of any hot turbine machinery debris that might be released and that might be capable of penetrating through the engine encasement, e.g., during destruction of the aft turbine area by guided missile impact. Directional characteristics of containment may be attained by placement of a containment liner with such a sub-tense of arc, that fragments that otherwise would impact and possibly penetrate wing skin, wing structure, control surfaces, engine support structure, or fuselage would have sufficient energy dissipated by the added protection layer. Advantageously, supplemental turbine-stage containment liners would in no way alter performance of normal fan-stage containment features.

Referring again to FIG. 2A, the outer core engine barrel 108 may be re-contoured to permit reduction of flow path losses from the interstitial mixer duct inlet through the surfaces of the lobed mixer and in application-specific configurations have additional acoustic lining, preferably encompassing as much of the wetted area as practical. The duct shell leading edge 182 is aerodynamically contoured to prevent separation and may be shaped to act as a low-loss flow inlet and may be positioned forward of the convergent section of the fan nozzle 126. In such manner, incoming gas velocity begins at a low fan duct velocity and pressure losses to the downstream mixer plane are minimized. Such a channeled gas path into the mixer duct 148 may remain diffused via subtle increase of the cross sectional area from the inlet area to slightly larger area as permitted by re-contouring the surface of the opposing core engine shroud 108. This may serve to further accommodate the radial thickness and outer flow line contour around the mixer duct shell 134 with minimal pressure loss in the contained flow path. The increased cross section may be retained through the fluid mixing device bounded by the inside of the mixer duct shell 134. Flow path tailoring is accomplished via the above re-contouring of the core engine shroud 108, shaping the mixer 164, and replacing the standard core nozzle with one of appropriately larger diameter. The contained flow path may remain adequately diffused at lower velocity until mixing is accomplished and the mixed outflow enters the convergent end of the nozzle exit 158.

The mixer 164 may be tailored for a low expansion rate and small core flow diffusion to accommodate lower scrubbing losses through the lobes. Lobe leading edge shapes may be broad, smooth and gradually tapered to precipitate a minimum in flow friction loss. Weight of the mixer and areas of surface affecting the scrubbing loss through the lobes may be reduced through scalloping the mixer's radial side walls. Scalloping of the mixer sidewalls enhances mixing prior to entering the convergent nozzle.

The above-described mixing can lower velocity differences and turbulent shear between mixer duct and fan bypass flows, resulting in much lower radiated jet noise. The mixing function also can significantly reduce aircraft plume radiance, thereby lowering susceptibility and increasing ability to defend with onboard defensive jamming systems reliant upon IR sensors that view outward to point toward and track the threat—potentially through own-plume self obscurations. In cases where there may be additional desire to reduce visibility or apparent temperature of hot metal exhaust parts, such reductions may be accomplished within the scope of this disclosure using various implementations of alternative mixer device designs: ones that impinge more cool airflow onto the aft exhaust plug surface, ones that utilize commercial or non-commercial low-emissivity coatings, and ones that twist the mixer surfaces so as to inhibit visibility to high temperature turbine areas and guide vanes. Various implementations of this disclosure are contemplated to employ any of a variety of mixer designs, or no mixer at all, to accomplish the reduction of radiated heat.

The structural integration of acoustic liners and debris containment liners can enhance reduction of interior engine cavity noise and can provide additional containment barriers for impact-generated debris, e.g., in cases where the aircraft engine cannot be defended against impact by IR guided missiles. The mixer duct shell attachment structure serves to permit support of the weight of the movable portion of the shell and facilitates its movement aft-ward to expose interior surfaces and parts for easier maintenance. In addition, the attachment structure facilitates moving the mixer duct shell aft-ward, thereby allowing use of normal maintenance procedures on modern turbofan engines that raise and support nacelle assembly halves to expose the core engine for easy maintenance. The affixed portion of the mixer duct inlet is positioned such that no interference is generated with the mechanisms and functions of the thrust reversers, and is also uniquely tailored to not induce self-noise or entrance flow losses. The above flow path features, including diffusion and flow shaping, can reduce flow path losses in the interstitial mixer duct up to and through the radial blending of the two flows, prior to entrance into the convergent mixed nozzle exit.

The foregoing discussion can be seen to describe a method for controlling exhaust plume heat and noise radiation from an aircraft turbofan engine assembly. A first portion of fan exhaust is routed through an interstitial mixer duct formed between an inner surface of a mixer duct shell and a core engine shroud of the engine assembly to a nozzle through which engine exhaust passes. A second portion of fan exhaust is routed over an outer surface of the mixer duct shell.

A nacelle mixing design implemented in accordance with the disclosure promotes internal mixing and can substantially slow jet velocities at the exit of an aircraft engine. Various implementations can simultaneously reduce community aircraft noise and infrared plume emissions of turbofan powered aircraft. The foregoing engine assembly can locally absorb additional damage that might be induced by high-velocity debris released into areas surrounding the aft engine system should the aft engine portion on an aircraft be impacted, e.g., by a heat seeking missile, protecting against possible collateral damage to fuel tanks, wing structures, control surfaces and/or fuselage.

Various implementations of the disclosure can provide comprehensive reduction in both noise and heat radiation over an entire takeoff and approach operational envelope by virtue of a partial amount of bypass internally ducted and efficiently mixed with high-velocity hot core exhaust. This greatly reduces community noise for commercial airplanes and infrared threat susceptibility for military airplanes. Various implementations also can provide reduction in plume energy sufficient to eliminate or reduce potential in-sensor-view interference for countermeasures systems, thereby increasing protection against, e.g., to man-portable air defense (MANPAD) systems.

An additional benefit is that various implementations also can enable high aerodynamic performance and greater cruise range flexibility at altitudes away from populations and threats, where the feature of internal mixing enhances fuel economy. At lower altitudes, implementations in accordance with principles of the disclosure can offer an ability to maximize thrust performance (allowing increasing fuel capacity or payload lift at takeoff), while keeping noise and heat emissions from the engine plumes well controlled. Modest changes can be made to outermost short-nacelle surfaces in accordance with principles of the disclosure while retaining high aerodynamic efficiency, low drag, and excellent propulsive performance.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. An aircraft comprising:
at least one turbofan engine assembly having a fan driven by a core engine, a short nacelle around the fan and a forward portion of the core engine, and a fan exhaust duct through the nacelle;
a mixer duct shell substantially coaxial with and extending forwardly into the fan exhaust duct to provide a mixer duct between the mixer duct shell and the core engine; and
a plurality of pillar mounts by which the mixer duct shell is mounted around the core engine, the pillar mounts positioned downstream of an outer wall exit plane of the fan exhaust duct and aligned to coincide with crowns of a plurality of lobes of a flow mixer on an aft section of the core engine within the mixer duct shell;
the mixer duct shell comprising a leading edge rearward of a thrust reversal device of the at least one engine assembly, the shell leading edge configured with the thrust reversal device to provide, when the thrust reversal device is deployed, a gap between the leading edge and the thrust reversal device through which a flow of air from the fan exhaust duct is reversed into the mixer duct.

2. The aircraft of claim 1, the mixer duct shell comprising a fixed forward portion, a movable aft portion, the pillar mounts selectively operable to engage the mixer duct shell aft portion with the mixer duct shell forward portion and to release the mixer duct shell aft portion for separation from the mixer duct shell forward portion;
each pillar mount having a forward part affixed to the mixer duct shell forward portion and to a shroud of the core engine, and an aft part affixed to the mixer duct shell aft portion and engagable with the pillar mount forward part.

3. The aircraft of claim 1, the mixer duct shell comprising an aft portion slidable selectively into and out of engagement with a forward portion of the mixer duct shell while supported in a track on a nylon to which the engine is mounted.

4. The aircraft of claim 1, the mixer duct shell comprising a nozzle exit edge having a plurality of chevrons.

5. The aircraft of claim 1, wherein the fan and mixer ducts are configured to provide partial mixing of fan and engine exhausts.

6. The aircraft of claim 1, the mixer duct shell further comprising one or more acoustic liners lining at least part of at least one surface of the shell.

7. The aircraft of claim 1, the mixer duct shell further comprising one or more debris containment liners lining at least part of an inner surface of the shell.

8. The aircraft of claim 1, wherein a portion of the short nacelle and a portion of a shroud of the core engine are configured to be raised with a portion of the mixer duct shell to provide access to the core engine.

9. The aircraft of claim 1, each pillar mount having a forward part affixed to the mixer duct shell forward portion and to a shroud of the core engine, and an aft part affixed to the mixer duct shell aft portion;
the pillar aft parts detachable from the pillar forward parts to springably release the mixer duct shell aft portion from the mixer duct shell forward portion.

10. An aircraft comprising:
at least one turbofan engine assembly having a core engine, a short nacelle around a forward portion of the core engine, and a fan duct through the nacelle; and
a mixer duct shell mounted around an aft portion of the core engine and having a forward portion extending forwardly into an exit nozzle of the nacelle to provide a mixer duct between the mixer duct shell and the core engine aft portion, the forward portion of the mixer duct shell being fixedly attached to a shroud of the core engine, an aft portion of the mixer duct shell being supported in a track on a pylon to which the engine is mounted, the aft portion of the mixer duct shell slidable along the track in an aft-ward direction to expose part of the shroud;
the mixer duct shell comprising a leading edge rearward of a thrust reversal device of the at least one engine assembly, the shell leading edge configured with the thrust reversal device to provide, when the thrust reversal device is deployed, a gap between the leading edge and the thrust reversal device through which a flow of air from the fan exit nozzle is reversed into the mixer duct.

11. The aircraft of claim 10 wherein the mixing of fan exhaust with engine exhaust is at about a 2:1 mass flow ratio.

12. The aircraft of claim 10, the mixer duct shell further comprising an exit nozzle edge having a plurality of chevrons.

13. The aircraft of claim 10, the mixer duct shell further comprising one or more acoustic liners lining at least part of at least one surface of the shell.

14. The aircraft of claim 10, the mixer duct shell further comprising one or more debris containment liners lining at least part of an inner surface of the shell.

15. The aircraft of claim 10, wherein a portion of the short nacelle and a portion of a shroud of the core engine are configured to be raised with a portion of the mixer duct shell to provide access to the core engine.

16. The aircraft of claim 10, the mixer duct shell comprising a plurality of pillar mounts by which the mixer duct shell aft portion is reversibly engaged with the mixer duct shell forward portion;
each pillar mount having a forward part affixed to the mixer duct shell forward portion and to the shroud, and an aft part affixed to the mixer duct shell aft portion;
the pillar aft parts detachable from the pillar forward parts to springably release the mixer duct shell aft portion from the mixer duct shell forward portion.

17. An aircraft comprising:
at least one turbofan engine assembly having a fan driven by a core engine, a short nacelle around the fan and a forward portion of the core engine, and a fan exhaust duct through the nacelle;
a mixer duct shell substantially coaxial with and extending forwardly into the fan exhaust duct to provide a mixer duct between the mixer duct shell and the core engine;
the mixer duct shell comprising a leading edge rearward of a thrust reversal device of the at least one engine assembly, the shell leading edge configured with the thrust reversal device to provide, when the thrust reversal device is deployed, a gap between the leading edge and the thrust reversal device through which a flow of air from the fan exhaust duct is reversed into the mixer duct;

the mixer duct shell having a fixed forward portion, a movable aft portion, and a plurality of pillar mounts selectively operable to engage the mixer duct shell aft portion with the mixer duct shell forward portion and to release the mixer duct shell aft portion for separation from the mixer duct shell forward portion;

each pillar mount having a forward part affixed to the mixer duct shell forward portion and to a shroud of the core engine, and an aft part affixed to the mixer duct shell aft portion and engagable with the pillar mount forward part.

18. The aircraft of claim 17, the pillar mounts aligned to coincide with crowns of a plurality of lobes of a flow mixer on an aft section of the core engine within the mixer duct shell.

19. The aircraft of claim 17, the aft portion of the mixer duct shell slidable selectively into and out of engagement with the forward portion of the mixer duct shell while supported in a track on a pylori to which the engine is mounted.

20. The aircraft of claim 17, the mixer duct shell comprising a nozzle exit edge having a plurality of chevrons.

21. The aircraft of claim 17, wherein the fan and mixer ducts are configured to provide partial mixing of fan and engine exhausts.

22. The aircraft of claim 17, the mixer duct shell further comprising one or more acoustic liners lining at least part of at least one surface of the shell.

23. The aircraft of claim 17, the mixer duct shell further comprising one or more debris containment liners lining at least part of an inner surface of the shell.

24. The aircraft of claim 17, wherein a portion of the short nacelle and a portion of a shroud of the core engine are configured to be raised with a portion of the mixer duct shell to provide access to the core engine.

25. The aircraft of claim 17, the pillar aft parts detachable from the pillar forward parts to springably release the mixer duct shell aft portion from the mixer duct shell forward portion.

* * * * *